No. 757,751. PATENTED APR. 19, 1904.
W. H. KESSLER.
MECHANISM FOR TRANSMITTING AND CONTROLLING POWER AND MOTION.
APPLICATION FILED NOV. 1, 1902. RENEWED OCT. 2, 1903.
NO MODEL. 2 SHEETS—SHEET 1.
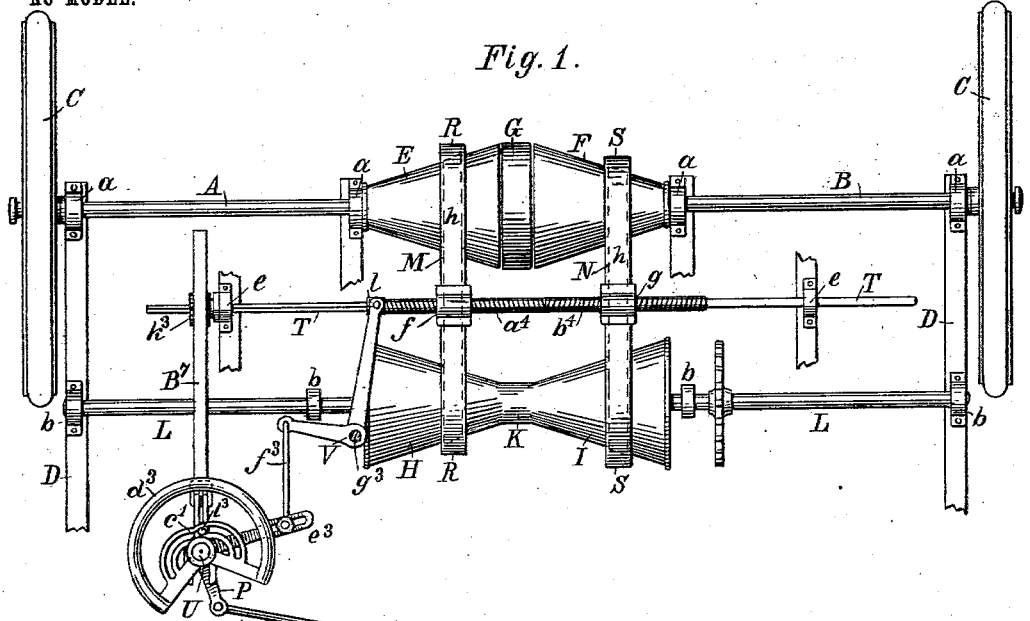
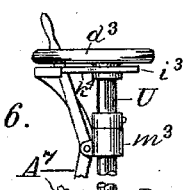
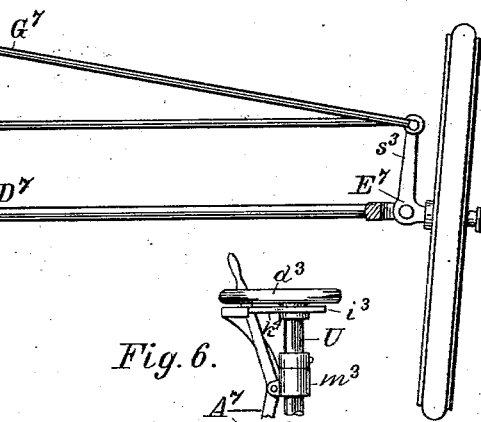
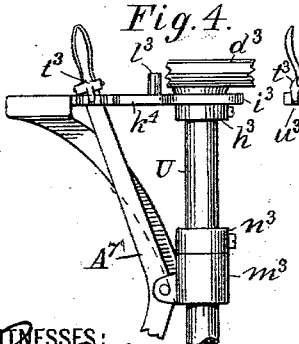
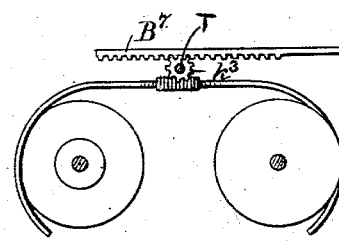
WITNESSES:
Geo. P. Hall
Herman Hare
INVENTOR
William H. Kessler
BY
James A. Whitney
ATTORNEY No. 757,751. PATENTED APR. 19, 1904.
W. H. KESSLER.
MECHANISM FOR TRANSMITTING AND CONTROLLING POWER AND MOTION.
APPLICATION FILED NOV. 1, 1902. RENEWED OCT. 2, 1903.
NO MODEL. 2 SHEETS—SHEET 2.
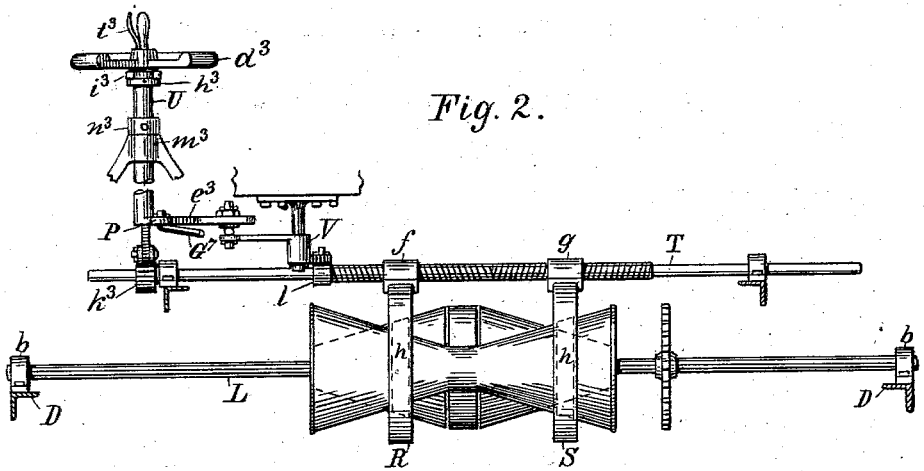
Fig. 2.
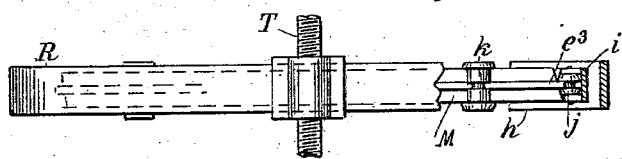
Fig. 7.
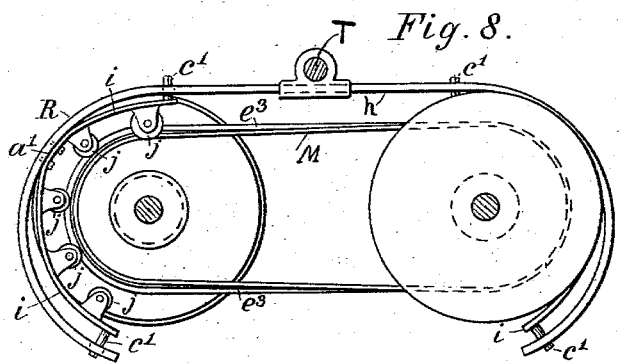
Fig. 8.
Fig. 9.
INVENTOR
William H Kessler
BY
James A Whitney
ATTORNEY
WITNESSES:

No. 757,751.

Patented April 19, 1904.

UNITED STATES PATENT OFFICE.

WILLIAM H. KESSLER, OF PASSAIC, NEW JERSEY.

MECHANISM FOR TRANSMITTING AND CONTROLLING POWER AND MOTION.

SPECIFICATION forming part of Letters Patent No. 757,751, dated April 19, 1904.

Application filed November 1, 1902. Renewed October 2, 1903. Serial No. 175,481. (No model.)

*To all whom it may concern:*

Be it known that I, WILLIAM H. KESSLER, a citizen of the United States, and a resident of Passaic, in the county of Passaic, in the State of New Jersey, have invented certain new and useful Improvements in Mechanisms for Transmitting and Controlling Power and Motion; and I do hereby declare that the following is a full, clear, and exact description of the same, reference being had to the accompanying drawings, making a part of this specification, in which—

Figure 1 is a plan view of apparatus made according to my invention. Fig. 2 is a front elevation and partial vertical transverse sectional view of the same. Figs. 3, 4, 5, and 6 are detail views of various parts of said apparatus. Fig. 7 is a plan and partial sectional view, on a larger scale, of certain parts thereof. Fig. 8 is a side view of parts shown in Fig. 7. Fig. 9 is a detail view of certain parts included in the apparatus.

This invention while primarily intended for the transmission, control, and varied application of power and motion in automobiles may, as to various of the combinations included therein, be applied to other uses in mechanics and the arts. It is designed to provide comparatively simple and wholly-effective means for meeting the many complicated exigencies which arise in the transmission and regulation of power to useful purposes, and to this end it comprises certain novel combinations of instrumentalities herein presently fully explained and described.

The invention is shown as embodied in an automobile; but, as just above indicated, certain of the combinations of parts included therein may be used for other purposes.

A B are two independent shafts which are axially in line with each other and which when, as shown in the drawings, the invention is used in an automobile constitute the rear axle of the latter, and for such purpose has each a traction-wheel C at its outer end. Each of the shafts A and B is supported in suitable bearings or boxes *a*, duly provided on the supporting-frame D. Upon the inner end of the shaft A is a tapering or elongated cone-pulley E, and upon the inner end of the shaft B is a similar elongated cone-pulley F, the two pulleys E and F tapering in opposite directions, with their smaller ends outward. Between the said two pulleys is a cylindric idler-pulley G, the circumference of which is flush with the adjacent circumferential edges of the larger or inner end of the pulleys E and F. This idler-pulley G is journaled upon the inner end or ends of one or both of the shafts A and B and runs loose therein between the larger and adjacent ends of said pulleys. Parallel with the pulleys E F and opposite thereto, as shown in Fig. 1, are two pulleys H and I, which correspond in taper and proportions with the pulleys E and F, except that their positions are reversed, the smaller ends of the two pulleys H and I being opposite the larger ends of the pulleys E and F, as shown in Fig. 1. Between the two pulleys H and I is a small cylindric pulley K, which is opposite the idler-pulley G. The pulleys H, I, and K are all fast on a driving-shaft L, which is parallel with the shafts A and B, which is revoluble by means of a chain and sprocket-wheel *c* or other suitable means actuated from any suitable source of power. These pulleys H, I, and K are preferably, but not necessarily, made in one piece, as shown in the drawings. The driving-shaft L is supported in suitable bearings *b* on the frame D. Extended from the pulley H to the pulley E is a belt M, and in like manner extended from the pulley I to the pulley F is a similar belt N. These belts M and N are shown in dotted lines in Fig. 1 and in full lines in Figs. 8 and 9. Each belt is flat with a longitudinal rib $e^3$ midway along its outside surface. As the belt M is moved toward the smaller end of the pulley H and the larger end of the pulley E, the motion of the latter, and consequently of its shaft A, is reduced. When the belt N is moved in the same direction toward the larger end of the pulley I and the smaller end of the pulley F, the motion of the latter and of its shaft is accelerated, and the two shafts being capable of independent motion a differential motion is afforded to them by the just-described shifting of the two belts. Of course a reverse movement of the two belts upon the pulleys reverses the action, the pulley F being slowed and the pulley E accelerated. The simultaneous movement of the two belts is provided for by belt-shifters, one to each belt. By the term "belt-shifter" I mean a belt-engaging device or devices the movement of which from suitable actuating mechanism shifts or transfers a belt from one set of pulleys to another. That for the belt M is shown at R and that for the belt N at S. These belt-shifters are identical in their structure and operation, which are as follows:

Supported in suitable bearings $e$ and parallel with the shafts A and B and the driving-shaft L is a revoluble shaft T, which is slidable in said bearings $e$, and being connected by belt-shifters that act simultaneously upon the two belts to move the same together in one direction or the other, as may be required, enables a differential motion to be given to the pulleys E and F and their respective independent shafts A and B. Thus when the shaft T is slid in one direction—as, for example, to the right—the motion of the pulley E is slowed, while simultaneously therewith that of the pulley F is increased, and vice versa. When a belt runs upon the loose pulley G, the tapering pulley from which said belt has come runs loose and inoperative. Upon the shaft T are two screws $a^4$ $b^4$, the threads whereof run in opposite directions. Upon one of these screws is a nut $f$ and upon the other a corresponding nut $g$. When the shaft is turned in one direction, the nuts approach each other. When the shaft is turned in an opposite direction, the nuts are spread farther apart. Each nut carries a shifting device to act upon the adjacent belt M or N, as the case may be. As the construction and operation of the two shifting devices is identical, a description of one is sufficient as a description of both. For convenience, however, the parts indicated by reference-letters in the shifting mechanism for the belt M are also indicated by the same reference-letters in the representation of the like mechanism for the belt N. Referring to the former, attached to the nut $f$ is a bar $h$, which extends over the belt M and has its end portions folded over the outer sides of the adjacent pulleys H and E, as shown in detail in Fig. 8. Upon the inner surface of each of said curved end portions are attached, as at $a'$ in said figure, leaf-springs $i$, which carry grooved pulleys $j$ $j$ and which at their ends are kept from lateral displacement by pins $c'$, which pass through holes in the bar $h$. The rib $e^3$ runs in the grooves $f'$ of the pulleys $j$, as illustrated in detail in Fig. 9, and is thereby held against lateral slip from the said pulleys $j$. To reinforce this action of the pulleys $j$, the grooves of some of the latter may be so formed that the whole width of the belt may travel therein, as indicated at $k$ at the right-hand end of Fig. 7. By turning the shaft T in one direction or the other, therefore, the distance apart of the two belts as they run over the pulleys, as described, may be readily increased or diminished.

To provide the requisite longitudinal and axial movements of the shaft T, and consequently of the oppositely-threaded screw thereon, there is provided mechanism shown in Figs. 1, 2, 3, 4, and 6, as follows: U is an upright hand-wheel shaft which works in suitable bearings and has at its top a hand-wheel $d^3$, whereby it may be turned. This shaft U has an arm or lever $e^3$, which by a rod or link $f^3$ connects with one arm of an elbow-lever V, the pivot of which is shown at $g^3$ and the other arm of which is pivoted to a collar $l$ on the sliding shaft T. This collar $l$ is so applied to said shaft that the latter may revolve within it while the collar is incapable of moving lengthwise upon the shaft. Consequently a lateral motion of the collar from the turning of the upright shaft U gives a sliding movement to the shaft T, which in its turn simultaneously moves the belt-shifters R and S in one direction or the other to simultaneously operate the pulleys E and F at differential speeds, as hereinbefore explained. Fast on the upright shaft U is a guide-block $h^3$, which supports the fork $i^3$ of a slide $k^4$, which has a projecting stud $l^3$, and with which connects a lever $A^7$, as shown more clearly in Figs. 3, 4, 5, and 6, and so that the movements of said slide affords a swinging motion to the lever $A^7$, the latter having its fulcrum or pivot in a bearing $m^3$, through which the upright shaft U turns freely, the shaft U being supported at the proper height thereon by a collar $n^3$, fast upon the shaft U. The lower arm of the lever $A^7$ connects with a slidable toothed rack $B^7$, one end of which is pivoted to the lower arm of the lever $A^7$, and which engages with a spur-pinion $k^3$ on the slidable shaft T, so that the motion given to the pinion $k^3$ from the lever $A^7$ in one direction or the other rotates the shaft T to enable the oppositely-threaded screws $a^4$ and $b^4$ to move the belt-shifters R and S, and consequently the belts, nearer each other or farther apart, according as the shaft T is turned in one direction or the other. The lever $A^7$ may be actuated by hand or automatically. To provide for the automatic operation of the lever, there is fast upon the upright shaft U a cam $c'$, into the slot of which projects the stud $l^3$, hereinbefore mentioned, of the slide $k^4$, so that the cam operating through the slide actuates the lever. To enable the latter to be detached from the slide when the lever is to be operated by hand, the lever has a spring-catch $t^3$, which holds on one or another of a series of notches $u^3$ on the slide. By operating this catch (shown more in detail in Fig. 5) the catch is brought clear of the notches $u^3$ to permit the independent manual operation of the lever. The pinion $k^3$, through which motion is transmitted from the rack $B^7$ to the shaft T, is so provided in its bearings as to be immovable laterally, but at the same time fast to the shaft, as concerns the rotation of the latter, the shaft being capable of sliding freely through the pinion while the latter rotates the shaft.

When the invention is embodied in an automobile, the latter is constructed with the usual front axle-bar $D^7$, with the wheel-axles provided on elbow-levers $E^7$, pivoted to the ends of the axle-bar, and the arms $s^3$ of the elbow-levers connected by a rod $F^7$ to insure their equal and simultaneous action in turning the vehicle. For the purposes of my invention I connect, by means of a rod $G^7$, the arm $s^3$ of one of the elbow-levers $F^7$ with an arm P, fast on the upright shaft U, so that the turning of the said upright shaft in the operations hereinbefore described turns the elbow-levers, on which are the axles of the front wheels, in the one direction or the other, as the case may be, in the turning of the vehicle. It will be noticed that the positions of the belts along said pulleys E and F may be adjusted to cause the said pulleys to revolve at different speeds. Also that by running one of the belts from one of the tapering pulleys M or N upon the idler-pully G such tapering pulley may be disengaged from said belt, so that its shaft A or B, as the case may be, will run idle. When the invention is embodied in an automobile, as just above indicated, the front wheels of the latter may be turned to any desired extent proportionate to the degree to which one of the tapering pulleys—in other words, one of the shafts A or B—is made to run slower (or faster) than the other to coöperate with the angle to which the elbow-levers $F^7$ are turned in the turning of the vehicle.

What I claim as my invention is—

1. The combination with two oppositely-arranged taper pulleys of corresponding shape and proportions placed in reversed relation with each other, and a belt extended from one to the other of said pulleys and laterally movable along their length, of a belt-shifter arranged over the belt and parallel therewith, a nut fast to said shifter, a slidable screw parallel with the axes of the pulleys and working through the nut, means for rotating the screw to operate the nut and means for sliding the screw regardless of the rotation thereof, as and for the purpose set forth.

2. The combination with two oppositely-arranged taper pulleys of corresponding shape and proportions placed in reversed relation with each other, a belt having a longitudinal rib upon its outer surface extended from one to the other of said pulleys and laterally movable along their length, of a belt-shifter, arranged over the belt, parallel therewith and having grooved pulleys which engage with the rib on the belt, a nut fast to said shifter, a slidable screw parallel with the axes of the pulleys and working through the nut, means for rotating the screw to operate the nut, and means for sliding the screw regardless of the rotation thereof, as and for the purpose herein set forth.

3. The combination with two tapering pulleys fast on independent shafts axially in line with each other, and two oppositely-arranged pulleys of corresponding shape and proportions placed in reverse relation to the two independent pulleys and parallel therewith, of belt-shifters extended from the oppositely-arranged pulleys to the independent pulleys, nuts fast to the belt-shifters, a slidable screw threaded in opposite directions and passed through the nuts of the belt-shifters, means for rotating said screw to move the belt-shifters farther apart or nearer together as the case may be, and means for sliding the screw irrespective of its rotation to actuate the belt-shifters to simultaneously shift the belts in one direction or the other along the pulleys, as and for the purpose set forth.

4. The combination with two tapering pulleys fast on independent shafts axially in line with each other, and two oppositely-arranged pulleys of corresponding shape and proportions placed in reversed relation to the two independent pulleys and parallel therewith, of belt-shifters extended from the oppositely-arranged pulleys to the independent pulleys, nuts fast to the belt-shifters, a slidable screw threaded in opposite directions and passed through the nuts of the belt-shifters, and means for rotating said screw, of a hand-wheel shaft, a radial arm on said shaft, an elbow-lever, one arm of which connects with the screw, while the other arm thereof connects by a rod or link with the radial arm of the hand-wheel shaft, as and for the purpose set forth.

5. The combination with two tapering pulleys fast on independent shafts axially in line with each other, and two oppositely-arranged pulleys of corresponding shape and proportions placed in reversed relation to the two independent pulleys and parallel therewith, of belt-shifters extended from the oppositely-arranged pulleys to the independent pulleys, a nut fast to each of the belt-shifters, a slidable screw threaded in opposite directions and passed through the nuts of the belt-shifters, means for sliding said screw, a pinion for rotating said shaft, a rack for operating said pinion, a hand-wheel shaft, a cam on said hand-wheel shaft, and means for connecting the rack with the cam, whereby the screw may be rotated from the motion of the hand-wheel, as and for the purpose set forth.

6. The combination with two tapering pulleys fast on independent shafts axially in line with each other, a cylindric idler-pulley placed between them, two oppositely-arranged pulleys of corresponding shape and proportions placed in reversed relation to the two independent pulleys, parallel therewith and having fast between them a cylindric pulley which is opposite the idler-pulley aforesaid, of belt-shifters extended from the oppositely-arranged pulleys to the independent pulleys, nuts fast to the belt-shifters, a slidable screw threaded in opposite directions and passed through the nuts of the belt-shifters, means for rotating the screw, and means for sliding said screw irrespective of its rotation to simultaneously shift the belts in one direction or the other and to bring one or the other of said belts, as the case may be, upon the small cylindric pulley and the idler-pulley, as and for the purpose set forth.

7. The combination with two tapering pulleys fast on independent shafts axially in line with each other, and two oppositely-arranged pulleys of corresponding shape and size and placed in reversed relation with the two independent pulleys and parallel therewith, belt-shifters extended from the oppositely-arranged pulleys to the two independent pulleys, nuts fast to the belt-shifters, a slidable screw threaded in opposite directions and passed through the nuts of the belt-shifters, a hand-wheel shaft, means for transmitting motion from the hand-wheel shaft to the screw to rotate the same, and means for transmitting motion from the hand-wheel shaft to the screw to slide the same, of a bar having pivoted at the ends thereof axles provided with elbow-levers, a rod connecting said elbow-levers and means for transmitting motion from the hand-wheel shaft to said elbow-levers, as and for the purpose described.

WILLIAM H. KESSLER.

Witnesses:
  JAMES A. WHITNEY,
  GEO. R. HALL.